Oct. 6, 1970

J. TREITERER 3,533,061

SOURCE-SENSOR LONGITUDINAL CONTROL SYSTEM

Filed Feb. 12, 1968

INVENTOR
Joseph Treiterer
BY
Anthony D. Cennamo
ATTORNEY

United States Patent Office 3,533,061
Patented Oct. 6, 1970

3,533,061
SOURCE-SENSOR LONGITUDINAL CONTROL SYSTEM
Joseph Treiterer, Worthington, Ohio, assignor to The Ohio State University, Columbus, Ohio, an institution of higher learning
Filed Feb. 12, 1968, Ser. No. 696,528
Int. Cl. G08g 1/09
U.S. Cl. 340—33          3 Claims

ABSTRACT OF THE DISCLOSURE

The invention is for a source-sensor longitudinal control system to monitor the safe spacing of vehicles traveling in a platoon.

BACKGROUND

Various means have been employed in the prior art in an attempt to increase the attainable safety on highways where vehicles are traveling in a platoon. Warning devices have been designed to energize the rear stop lights of the following vehicle(s) or to flash the rear stop lights of the lead vehicle if another vehicle is following too closely, as disclosed in H. R. Copsy, Pat. No. 3,210,726, granted Oct. 5, 1965, and C. L. Meyer, Pat. No. 3,192,437, granted June 29, 1965, respectively. Neither of these two systems provide any information which will tell the driver of the following vehicle how fast he is approaching the vehicle ahead of him or warn him of a slow moving or stopped vehicle so that he is aware of the inherent danger of the situation in sufficient time to permit the taking of the proper corrective action. The Meyer rear warning signal system utilizes the intensity of the headlamps of the succeeding vehicle to determine when the minimum spacing has been exceeded and is therefore limited to operation at night and under ideal weather and highway conditions.

SUMMARY OF INVENTION

The invention relates to longitudinal control between vehicles traveling in a platoon. The system utilizes modulated radiation as the means for transmitting the necessary information between vehicles. The principle of differential velocity is applied in the invention to indicate the rate of closure of the trailing vehicle on the leading vehicle. An indication of the distance between the two vehicles is provided by measuring the intensity of the signal from the preceding vehicle.

The present invention solves several problems previously existent in the prior art. The indication of a high differential velocity between the lead vehicle and the following vehicle will tell the driver how fast he is approaching the vehicle ahead of him and will warn him of a slow moving or stopped vehicle long before he can sense the inherent danger of the situation. If the vehicles traveling in a platoon are controlled in such a way that the differential velocity tends to be zero at all times then a stable, undisturbed and safe traffic flow of increased efficiency will result. No control for minimum spacing is necessary if the differential velocity between the lead vehicle and the following vehicle can be maintained to be zero at all times. The control of minimum spacing provided by the present invention gives drivers the opportunity to select a minimum distance to the lead vehicle which will meet their personal requirements with regard to reaction time, weather, road surface conditions, and their driving attitude. The infrared region of the spectrum was chosen for the preferred embodiment because of its superior transmission in fog compared to the visible region and because ordinary glass optical systems could be used. Another consideration for choosing the infrared region is that drivers in trailing vehicles would not be affected by the powerful light of the modulated source.

OBJECTS

Accordingly it is a principal object of the invention to provide an improved longitudinal control system to control vehicle movement in a platoon of vehicles.

Another object of the invention is to provide information on the rate of closure (differential velocity) of vehicles following one another.

Another object of the invention is to provide information of the distance between vehicles following each other under various driver, weather, and highway conditions.

A further object of the invention is to provide a longitudinal control system in which construction is inexpensive and performance is reliable.

Still a further object of the invention is to provide such an improved system which can be installed in existing vehicles with a minimum of modification and cost.

For a complete understanding of the invention, together with other objects and advantages thereof, reference may be made to the accompanying drawings, in which:

DETAILED DESCRIPTION OF THE DRAWINGS

Figure 1:
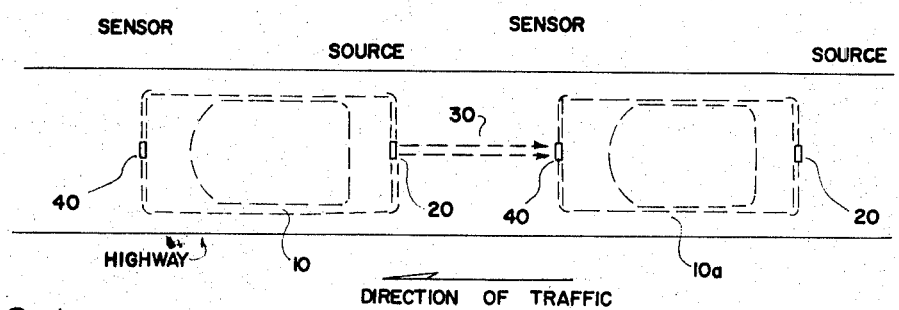
FIG. 1 is a schematic view of a pair of vehicles traveling in a normal traffic configuration.

The two vehicles 10 shown in the schematic view of FIG. 1 are traveling in the same direction along a highway. In accordance with this invention, each vehicle 10 is equipped with a source 20 of pulsating radiation which is mounted on the rear of each vehicle 10 which radiates a pulsated signal 30 along the highway in the direction opposite travel. A sensor 40 is mounted on the front of each vehicle 10 in such a way that the signal 30 from the source 20 is received.

For purposes of illustration a pulsated infrared source is described in the preferred embodiment but it is not intended by this to limit the scope of the invention to this medium of radiation.

Figure 2:
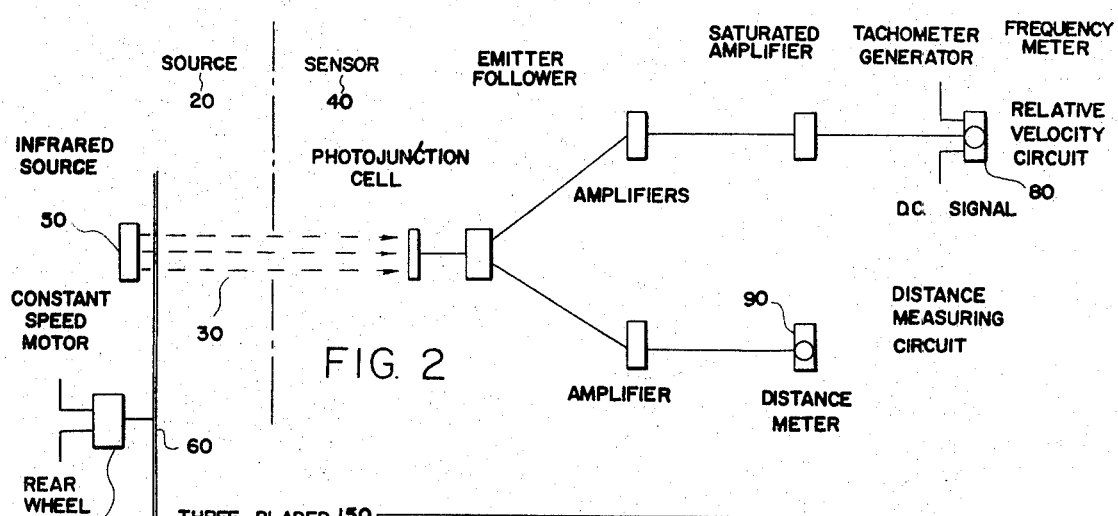
FIG. 2 is a schematic view of the source and sensor circuits of the preferred embodiment, in block form.
Figure 3:
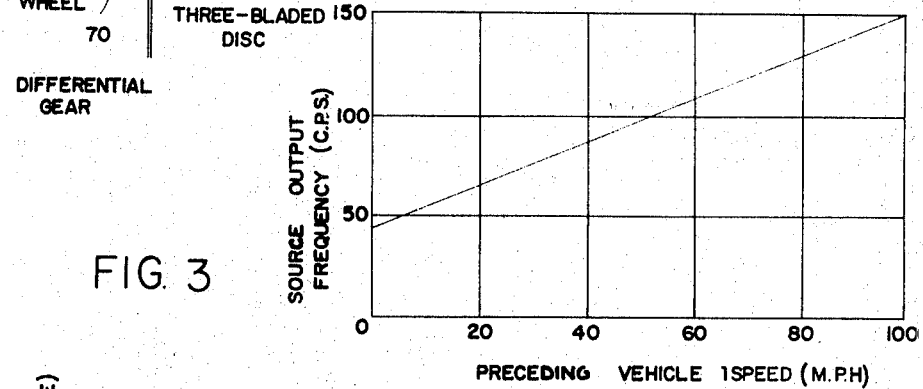
FIG. 3 is a graphical representation of the source output frequency as a function of the preceding vehicle's speed; and, FIG. 4 is a graphical representation of a typical measured calibration curve for the distance measuring circuit.

A block form schematic view of the source 20 and and the sensor 40 circuits of the preferred embodiment are shown in FIG. 2. The source 20 comprises an infrared light source 50 whose beam is pulsed, with the pulse frequency being a function of the vehicle 10 speed. The pulsing of the infrared light source 50 is provided by a rotating three-bladed disc 60 arranged in front of the infrared source 50. This disc 60 is coupled to the output of a differential gear 70. One input to the differential gear 70 is coupled to a rear wheel of the preceding vehicle 10 through a flexible shaft. This provides an output signal frequency which is a function of the vehicle 10 speed. The second differential input is coupled to a constant speed motor. This serves to provide a pulsed beam 30 when the preceding vehicle 10 is stopped on the highway. A graphical representation of the source output frequency as a function of the preceding vehicle 10 speed is shown in FIG. 3.

The sensor 40 circuit is also illustrated in block form in FIG. 2. The sensor unit 40 has been designed to detect the signal 30 from the preceding vehicle 10 and convert it to speed. This signal is then compared with the speed of the following vehicle 10a. The speed of the trailing vehicle 10a minus the speed of the leading vehicle 10 is displayed on a meter 80, calibrated in miles per hour, in the trailing vehicle 10a. Once the trailing vehicle 10a is close enough for the sensor 40 to lock onto the leading vehicle 10 the driver of the following vehicle 10a is always aware of whether he is traveling slower, faster, or at the same speed as the leading vehicle 10. The response time of the system is made less than the human reaction time, and it can be expected that safety in the car following situation can be improved considerably if suitable arrangements are made for a control of the trailing vehicle 10a, however, the said arrangements are not illustrated in the present patent application.

Figure 4:
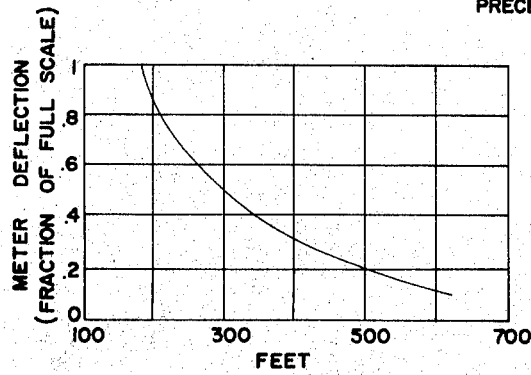

An additional safe guard against following too closely has been developed by measuring the intensity of the signal 30 from the preceding vehicle 10 to determine the distance between vehicles. FIG. 4 shows the meter 90 deflection at different separation distances. It can be seen that for the setting shown, the meter 90 is rather sensitive at a range below 300 feet. The sensitivity of the distance measuring circuit varies with weather conditions, and it is left to the driver of the following vehicle 10a to adjust the sensitivity of this distance measuring instrument for a spacing which he considers safe. Predetermined energy level or meter deflection could then be made to actuate a danger signal and/or close the throttle automatically and initiate braking if the trailing vehicle 10a gets too close to the leading vehicle 10.

Although a preferred embodiment has been illustrated, it is to be understood that modifications may be made without departing from the true spirit and scope of the invention.

What is claimed is:

1. A longitudinal control system for vehicles traveling in a platoon, having means for transmitting from the rear of the leading vehicle signals containing information relating to the velocity and position of said leading vehicle and means for receiving said signal in the following vehicle, and means in said following vehicle for converting said signal to an indication of the differential velocity of the said two vehicles and the distance between the said two vehicles, the improvement in said control system comprising: a source of radiation in said leading vehicle, means for pulsating said radiation, said pulse rate correlated to the velocity of said leading vehicle, means for transmitting said pulsated radiation, said last mentioned means further providing a signal in the event said leading vehicle is stationary; and means in said following vehicle to receive said transmitted signal, means to amplify said received signal, an indicating means which relates the intensity of said signal to the distance between the said two vehicles, a second indicating means which compares the pulse rate of the said signal with a signal produced by a tachometer generator driven from the following vehicle's speedometer cable, said last mentioned means further providing compensation to balance out the stationary signal received from the said leading vehicle, wherein the result of the comparison represents the differential velocity of the said two vehicles.

2. A longitudinal control system as set forth in claim 1 wherein said radiation is infrared light; said pulsating means a multi-bladed disc arranged in said system, wherein said disc when rotated interrupts the said infrared radiation beam, said disc rotated by the output of a differential gear; said stationary signal provided by a constant speed motor; and said receiving means utilizing a photojunction cell to detect the said transmitted signal.

3. A longitudinal control system as set forth in claim 1 wherein said second indicating means comprises a capacitor charge and discharge type of frequency meter.

References Cited
UNITED STATES PATENTS
3,235,025    2/1966    Quinn _____ 340—33

THOMAS B. HABECKER, Primary Examiner

U.S. Cl. X.R.

340—62